US012366161B2

(12) United States Patent
Peters (10) Patent No.: US 12,366,161 B2
(45) Date of Patent: Jul. 22, 2025

(54) SYSTEM AND METHOD FOR MEASURING DOWNHOLE MUD FLOW DENSITY

(71) Applicant: Volker Peters, Celle (DE)

(72) Inventor: Volker Peters, Celle (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/854,420

(22) Filed: Jun. 30, 2022

(65) Prior Publication Data

US 2023/0003628 A1 Jan. 5, 2023

Related U.S. Application Data (60) Provisional application No. 63/216,920, filed on Jun. 30, 2021.

(51) Int. Cl.
*E21B 47/18* (2012.01)
*E21B 21/08* (2006.01)
(Continued)

(52) U.S. Cl.
CPC .............. *E21B 47/18* (2013.01); *E21B 21/08* (2013.01); *E21B 49/08* (2013.01); *G01N 9/10* (2013.01); *G01N 9/34* (2013.01)

(58) Field of Classification Search
CPC .......... E21B 47/10; E21B 47/18; E21B 21/00; E21B 21/08; E21B 49/08; G01N 9/10; G01N 9/32; G01N 9/34
See application file for complete search history.

(56) References Cited

U.S. PATENT DOCUMENTS 7,141,901 B2 * 11/2006 Spring ................ E21B 41/0085
310/113
2014/0291023 A1 10/2014 Edbury et al.
(Continued)

FOREIGN PATENT DOCUMENTS

WO 2010085401 A1 7/2010
WO 2014099789 A1 6/2014

OTHER PUBLICATIONS

International Search Report and Written Opinion Mailed: Oct. 19, 2022, PCT/US2022/035421, filed Jun. 29, 2022, 6 pages.

*Primary Examiner* — Nicole Coy
*Assistant Examiner* — Nicholas D Wlodarski
(74) *Attorney, Agent, or Firm* — CANTOR COLBURN LLP (57) ABSTRACT

A system and method of determining a density of a drilling fluid in a wellbore. The system includes a drill string in the wellbore, the drill string including a downhole rotor. A drilling fluid flowing through the drill string in the wellbore causes the downhole rotor to rotate relative to the drill string. A brake is configured to apply a first brake torque to the downhole rotor to place the downhole rotor in a first state. A torque measurement system is configured to determine the applied first brake torque. A rotor speed measurement system is configured to measure a first downhole rotor speed of the downhole rotor having the drilling fluid flowing therethrough with the downhole rotor in the first state. A processor is configured to determine a density of the drilling fluid from the measured first downhole rotor speed, and the determined applied first brake torque.

27 Claims, 4 Drawing Sheets

(51) Int. Cl.
*E21B 49/08* (2006.01)
*G01N 9/10* (2006.01)
*G01N 9/34* (2006.01)

(56) References Cited

U.S. PATENT DOCUMENTS

| | | | |
|---|---|---|---|
| 2015/0376963 A1* | 12/2015 | Orban | E21B 21/08 416/61 |
| 2016/0245048 A1 | 8/2016 | Jamison et al. | |
| 2017/0204688 A1 | 7/2017 | Song et al. | |
| 2021/0003230 A1 | 1/2021 | Peters | |

* cited by examiner

SYSTEM AND METHOD FOR MEASURING DOWNHOLE MUD FLOW DENSITY

CROSS REFERENCE TO RELATED APPLICATIONS

This application claims the benefit of an earlier filing date from U.S. Provisional Application Ser. No. 63/216,920 filed Jun. 30, 2021, the entire disclosure of which is incorporated herein by reference.

BACKGROUND

In the resource recovery industry, knowledge of a property of a fluid in a wellbore, such as fluid density, can be used when performing various downhole operations, such as mud pulse telemetry, acoustic logging, etc. As an example, a mud pulse telemetry system includes a pulser at the downhole location that generates a pressure pulse in mud flowing through the wellbore. Data is transmitted by having the pressure pulse travel through the mud to a sensor at the surface location. The signal strength of the pressure pulse depends on various mud properties, such as primarily flow rate, mud density, and the settings of the pulser. Therefore, when the mud properties change, the settings for creating the pressure pulse can be changed accordingly to prevent excessive pressure pulses, damage or other discrepancies. Such changes are made based on mud property measurements. For accurate pulser adjustments, there is a need to have the mud measurements made downhole near the location of the pulser.

SUMMARY

A method of determining a density of a drilling fluid in a wellbore. A drill string is conveyed into the wellbore, the drill string including a downhole rotor. The drilling fluid is flowed through the drill string in the wellbore causing the downhole rotor to rotate relative to the drill string. A first brake torque is applied to the downhole rotor to place the downhole rotor in a first state. The applied first brake torque is determined. A first downhole rotor speed of the downhole rotor having the drilling fluid flowing therethrough is measured with the downhole rotor in the first state. A density of the drilling fluid is determined from the measured first downhole rotor speed, and the determined applied first brake torque.

A system for determining a density of a drilling fluid in a wellbore. The system includes a drill string in the wellbore, the drill string including a downhole rotor, a drilling fluid flowing through the drill string in the wellbore causing the downhole rotor to rotate relative to the drill string, a brake configured to apply a first brake torque to the downhole rotor to place the downhole rotor in a first state, a torque measurement system configured to determine the applied first brake torque, a rotor speed measurement system configured to measure a first downhole rotor speed of the downhole rotor having the drilling fluid flowing therethrough with the downhole rotor in the first state, and a processor configured to determine a density of the drilling fluid from the measured first downhole rotor speed, and the determined applied first brake torque.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
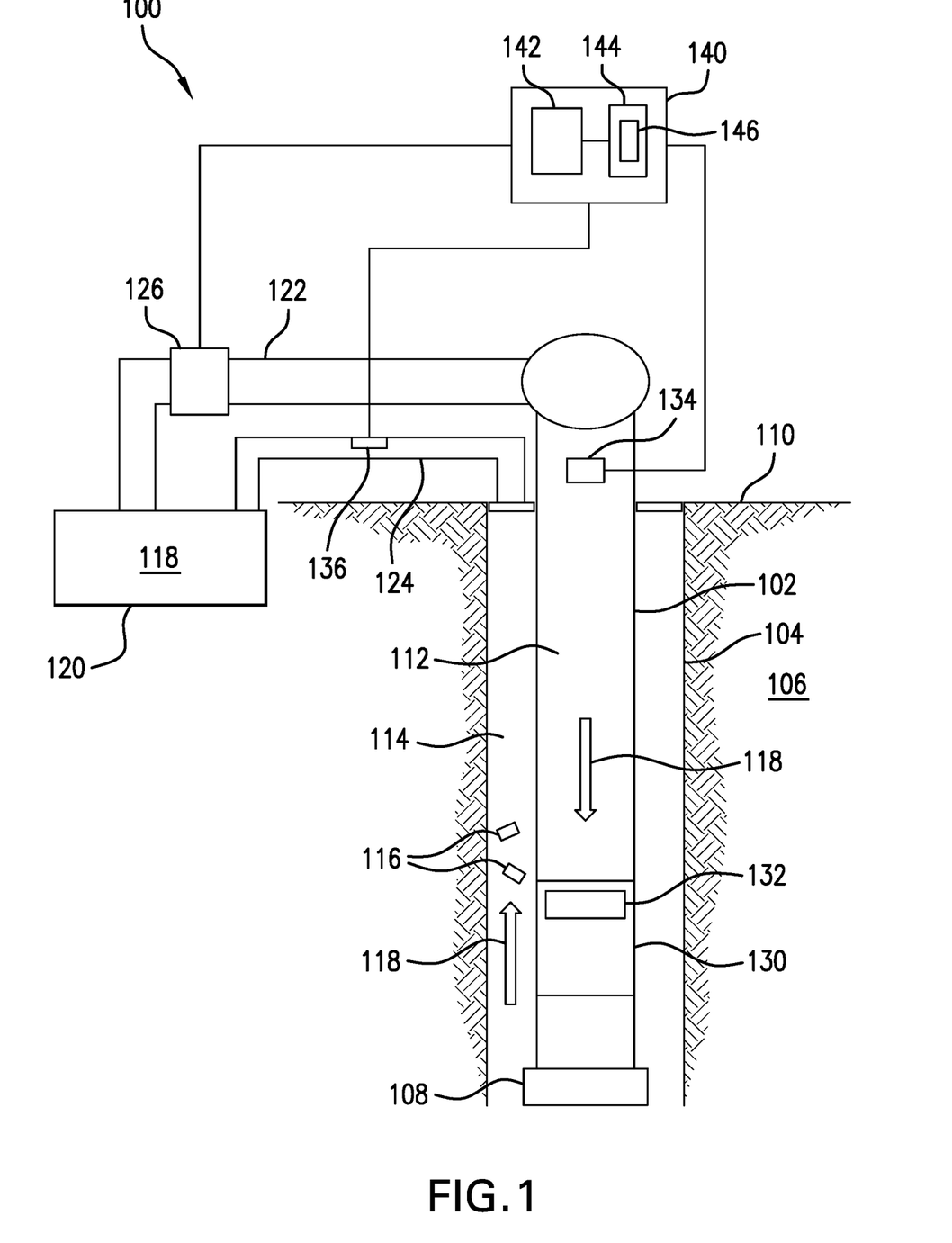
FIG. 1 shows a wellbore system in an illustrative embodiment.

Referring to FIG. 1, a wellbore system 100 is shown in an illustrative embodiment. The wellbore system 100 can be a drilling system, as shown in FIG. 1, or any other suitable system, such as a completion system, etc. The wellbore system 100 includes a drill string 102 for drilling a wellbore 104 in a formation 106. The drill string 102 extends downhole into the wellbore 104 from a surface location 110. The drill string 102 includes a drill bit 108 at an end thereof and defines an inner bore 112 and an annulus 114 between the drill string 102 and a wall of the wellbore 104. Rotation of the drill bit 108 creates cuttings 116 at a bottom of the wellbore 104.

The wellbore system 100 further includes a mud pit 120 at the surface location 110 having a drilling mud 118 (also referred to as "drilling fluid" or simply "mud") stored therein. A standpipe 122 serves as a conduit for flow of the drilling mud 118 from the mud pit 120 to an entry of the drill string 102 at a top of the drill string 102. A return line 124 allows for flow of drilling mud 118 from the drill string 102 back to the mud pit 120. During drilling, a mud pump 126 in the standpipe 122 pumps the drilling mud 118 from the mud pit 120 through the standpipe 122 and into the drill string 102. The drilling mud 118 flows downhole through the inner bore 112 of the drill string 102 and exits the drill string 102 via the drill bit 108 at the bottom of the wellbore 104. The drilling mud 118 then flows upward to the surface location 110 through the annulus 114 and returns to the mud pit 120 via the return line 124. In the annulus 114, the drilling mud 118 carries the cuttings 116 from the wellbore 104 to the surface location 110. Various devices at the surface location 110 (not shown) can be used to separate the cuttings 116 from the drilling mud 118 before the drilling mud 118 is deposited back into the mud pit 120.

A control system 140 controls various operations of the wellbore system 100. The control system 140 includes a processor 142 and a memory storage device 144. The memory storage device 144 can be a solid-state device. One or more programs 146 are stored on the memory storage device 144. The processor 142 accesses the programs 146 to control operation of the wellbore system 100 based, in part, on various parameter determined using the methods disclosed herein. In one aspect, the control system 140 controls operation of the mud pump 126, thereby controlling a mud flow rate through the drill string 102.

The drill string 102 includes a bottomhole assembly 130 (BHA) at downhole location. The bottomhole assembly 130 performs various downhole operations, such as measuring one or more parameters of interest, for example by fluid testing, formation testing, etc. The bottomhole assembly 130 includes a pulser 132 that is part of a mud pulser telemetry system. The pulser 132 includes a passageway for fluid to flow through and a valve operable to open and close the passageway. The valve can be operated to obstruct the passageway, either fully or partially, to reduce or interrupt the flow of fluid through the passageway, thereby generating a pressure pulse in the fluid.

A sensor 134 of the mud pulse telemetry system can be disposed in the inner bore of the drill string 102 at the surface location 110. Additionally, or alternatively, a sensor 136 can be disposed in the return line 124. The sensor 134 and/or the sensor 136 can be an acoustic sensor or a pressure sensor in various embodiments and are used to measure the pressure pulse generated in the mud by the pulser 132.

In order to communicate data from downhole to the surface location 110, the pulser 132 is activated to generate a pressure pulse in the mud traveling through the drill string 102. In general, activating the pulser 132 generates a positive pressure pulse and a negative pressure pulse. The negative pressure pulse travels down hole from the pulser 132 through the inner bore 112, passes out of the drill string 102 via the drill bit 108 and travels uphole through the annulus 114 to be detected at sensor 136. The positive pressure pulse travels uphole through the inner bore 112 of the drill string 102 and is detected at the sensor 134. Sensor 134 and sensor 136 are in communication with control system 140 and measurements of the pressure pulse can be sent form the sensor 134 and/or sensor 136 to the control system 140. Using this method various temporal patterns of pressure pulses can be generated at the pulser 132 and interpreted at the control system 140 in order to communicate data to the surface location 110.

The strength of the pulse when it is received at the uphole sensors is based on the magnitude of the pressure pulse, also referred to as the signal strength, generated by the pulser 132 but also on various mud properties. The signal strength itself is affected by mud properties such as a flow rate of the mud and a mud density. Various operating parameters of the pulser 132 such as, but not limited to, the degree to which the valve closes the passageway and the speed of the valve, can be controlled or adjusted in order to control or adjust the strength or intensity of the pressure pulse generated by the pulser 132 such as a parallel connection or a combination of a parallel and a serial connection.

Figure 2:
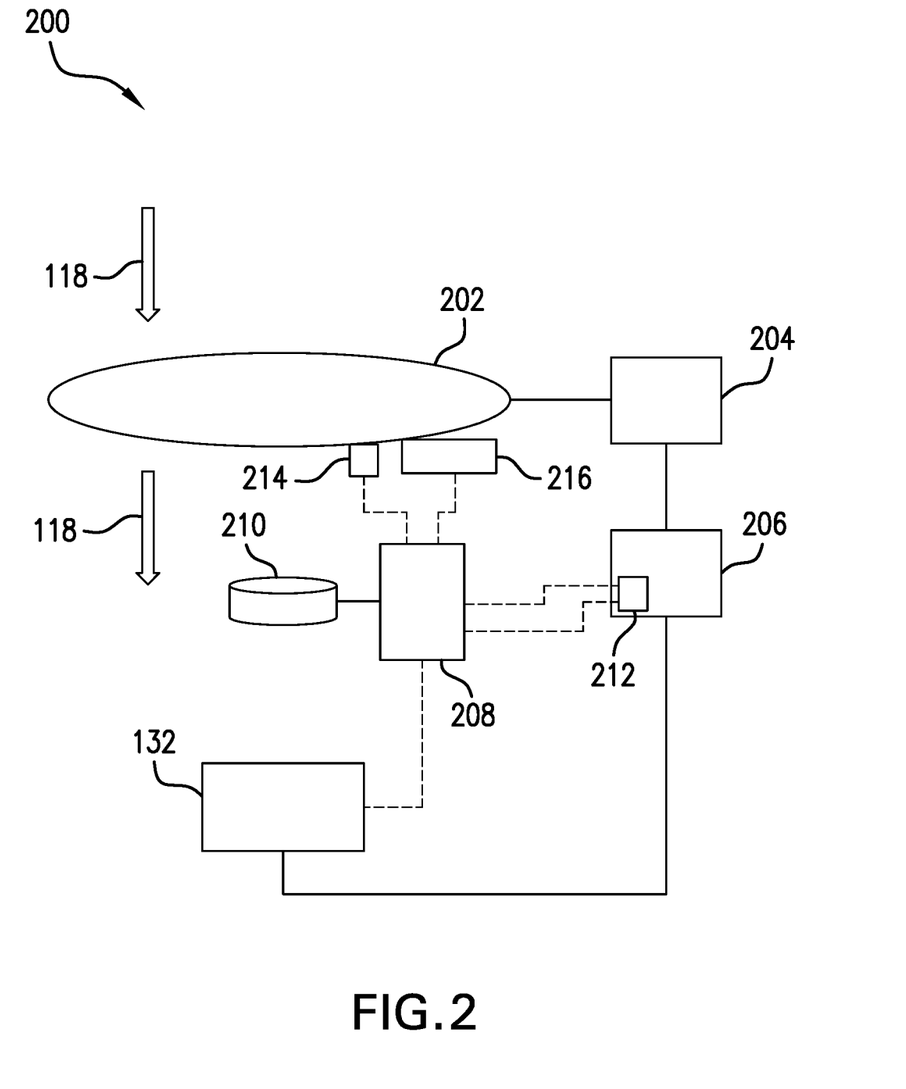
FIG. 2 shows a schematic representation of a downhole pulser system.

FIG. 2 shows a schematic representation of a downhole pulser system 200 for operating the pulser 132. The downhole pulser system 200 includes the pulser 132, a downhole rotor 202, such as a motor or a turbine having a part that rotates relative to the drill string 102 in response to the flow of the drilling mud 118 through the downhole rotor, an alternator 204 that converts a mechanical rotation at the downhole rotor 202 into an electrical current for powering the pulser 132 and other components of the bottomhole assembly 130, an electrical load 206 (also referred to as electrical resistance), and the pulser 132. The electrical load 206 is shown in FIG. 2 as being in series between the alternator 204 and the pulser 132. However, other wiring configurations of the electrical load 206, the alternator 204 and the pulser 132 are possible in alternate embodiments.

In various embodiments, the electrical load 206 is a resistive element that can be switched into and out of the circuit between the alternator 204 and the pulser 132. The presence of the electrical load 206 causes a mechanical resistance to rotation at the alternator, which causes a braking torque (also referred to herein as brake torque) to be applied, via the alternator 204, at the downhole rotor 202, thereby activating a brake to reduce a downhole rotor speed. The electrical load 206 can therefore be used as a brake device to apply a selected braking torque at the downhole rotor 202. As discussed herein, the downhole rotor 202 is in a first state or a substantially unloaded state when the electrical load 206 is not present within the circuit. The downhole rotor 202 is placed into a second state or a loaded state when the electrical load 206 is introduced into the circuit, causing a brake torque to be applied to the downhole rotor. Alternatively, the first and second state can be selected by applying a brake at a first (low) load and at a second (high) load, causing the first state and the second state to represent two defined loading states and thus two defined braking states of the downhole rotor. In an alternate embodiment, more than a first and second state can be selected, such as a third state, a fourth state, etc.

The magnitude of the resistance provided by the resistive element can be adjusted or controlled to control the amount of braking torque applied to the downhole rotor 202. In one embodiment, a transistor, such as a pulse width modulated transistor can be used to control the magnitude of the electrical load 206 on the alternator 204. In another embodiment, the phase of the alternator 204 can be altered or shortened to create the brake torque. In various embodiments, the electrical load 206 can be any electronic device being used downhole, including the pulser 132.

A downhole processor 208 is in communication with the electrical load 206 and the pulser 132. The downhole processor 208 can send signals to the pulser 132 to generate a pulse and to adjust an operating parameter of the pulser 132 (e.g., an amount of valve closure, a valve speed, etc.) to achieve a selected signal strength for the resulting pressure pulse. The downhole processor 208 can also control a magnitude of the electrical resistance at the electrical load 206, thereby controlling a magnitude of a braking torque at the downhole rotor 202. The speed of the downhole rotor 202 is related to the electrical torque applied at the alternator 204. In general, the higher the braking torque, the lower the speed (also known as rotational velocity, e.g., revolutions per minute or rpm) of the downhole rotor. Therefore, the braking torque can be controlled to control the rotational velocity. In an embodiment, the downhole processor 208 reduces the rotational velocity to obtain a selected downhole rotor speed based on a relation discussed below with respect to FIG. 3.

An electrical sensor 212 measures an electrical resistance at the electrical load 206. A rotation sensor 214 measures a rotation rate or downhole rotor speed of the downhole rotor 202. Additional sensors (not shown) can be used to measure operating parameter of the pulser system 200. These sensor measurements can be sent to the downhole processor 208 to enable the downhole processor 208 to obtain measurements and perform the methods disclosed herein.

In an alternate embodiment, the downhole pulser system 200 includes a mechanical brake 216 that can be used as the brake device. The brake can be a friction brake, a viscous brake, an eddy current brake, or other suitable mechanism to generate a braking moment. The mechanical brake 216 can be activated by the downhole processor 208 to apply a mechanical brake torque to the downhole rotor 202. The mechanical brake can be used to switch between one or more levels of brake torque and thus decelerate the downhole rotor to a reduced speed level. In case of an eddy current brake, the brake may be switched between one or more levels, by switching between one or more resistors through which the eddy current that is generated by the movement of the rotating downhole rotor flows through. Sensors (not shown) on the mechanical brake 216 can measure the braking torque and send this data to the downhole processor 208. Sensors to measure the braking torque may include strain gauges, or force measurement devices including spring elements or other elastically deformable elements. In case of an eddy current brake, the sensor may be a current sensor or magnetic field sensor that is sensitive to the eddy current that is generated by the rotation of the downhole rotor. Alternatively, or in addition, alternator 204 in conjunction with electrical load 206 can be used to determine the braking torque by measuring one or more of current through electrical load 206, voltage drop at electrical load 206, and the rotating speed of alternator 204. From the rotating speed of alternator 204, the rotor speed of the downhole rotor 202 can be determined.

The signal strength of a pressure pulse recorded at sensors 134 and 136 is dependent on various mud characteristics, such as mud flow rate and mud density at the pulser 132, as well as operating parameters of the pulser, such as valve speed and the degree of passageway obstruction. The pulse pressure at a selected valve setting (obstruction) is related approximately linearly to the mud density and quadratically to the mud flow rate. The mud flow rate and the mud density can vary over various ranges while pulser 132 is in use, thereby affecting the signal strength over time. Thus, the downhole processor 208 monitors the mud characteristics and adjusts the operating parameters of the pulser 132 to maintain a selected signal strength base on the change in the mud characteristic, as discussed below.

The downhole rotor speed in the first state (i.e., with no brake torque or a predefined low level of brake torque applied) is related to the mud flow rate. Therefore, the mud flow rate can be determined by measuring a rotation rate or downhole rotor speed of the downhole rotor 202 when the downhole rotor is in the first state.

The mud density can be determined by measuring the downhole rotor speed with the downhole rotor 202 in both the first state and the second state (i.e., brake torque or a predefined high level of brake torque applied). The rotation sensor 214 measures a first downhole rotor speed with the downhole rotor in the first state, while the flow rate of the mud through the downhole rotor is constant. It is to be understood that a constant flow rate is considered to be established when the downhole rotor speed at the first state remains within a predetermined range for a selected duration. Once the first downhole rotor speed has been measured, a braking torque is applied to the downhole rotor 202 to place the downhole rotor in the second state. The braking torque can be a specified or predetermined braking torque. In the second state, rotation sensor 214 measures a second downhole rotor speed. Although the mud flow is generally not directly measurable when the downhole rotor is in the second state, it is assumed that the mud flow rate remains constant over the duration of the measurement while the downhole rotor is in the second state. The mud density is determined from the value of the braking torque and the difference between the first downhole rotor speed and the second downhole rotor speed, as will be discussed with respect to FIG. 3. This sequence can be repeated multiple times to obtain multiple measurements, which allows for a statistical analysis of the multiples in which a mean value as well as maximum and minimum values, variances, standard deviations, and the like can be determined. These multiple measurements can be used to derive a more precise measurement of mud density.

In order to verify that the flow rate does not change as the downhole rotor changes between the first and the second state, a verification measurement can be made of the downhole rotor speed after the second measurement, with the parameters of the downhole rotor returning to that of the first state. In a scenario in which the difference between the first downhole rotor speed measurement and the verification measurement exceeds a threshold, the flow rate is assumed to be not constant enough to obtain a precise measurement. In such a scenario, the measurements can be flagged, aborted and/or repeated. In various embodiments, a duration of a measurement can be relatively short. In one embodiment, a duration of a measurement when the downhole rotor is in one state can be about 0.1 seconds. In another embodiment, the duration for the measurement can be several seconds or minutes. In yet another embodiment, the downhole rotor speed and braking torque (sometimes also referred to as braking load or brake load) can be monitored continuously over the entire duration of a drilling operation. When the duration of the measurement is short (i.e., below about 1 second), the measurement of the second downhole rotor speed with the downhole rotor in the second state and the subsequent verification measurement can be obtained directly once the measurement of the downhole rotor in the first state has been made. Mud flow rates can be assumed to be constant unless the mud pump 126 has been turned on or shut down in a preselected time interval. A constant flow rate is considered to be established when the downhole rotor speed at the first state remains within a predetermined range for a selected duration. Even when the mud flow rate is not fully constant over an extended period of time, one can still derive valid measurements by alternating the duration of the measurement appropriate to the downhole rotor state. A typical range for a braking torque is between about 0.5 Nm and 20 Nm, depending on the size of the downhole rotor and the flow rate of the mud.

Once the mud density and flow rate have been determined, an operating parameter of the pulser 132 can be adjusted to provide a suitable signal strength based on the mud density and the flow rate. In various embodiments, the signal strength can be determined using an equation or stored values (such as a lookup table between or of signal strength mud density and mud flow rate, respectively).

In another embodiment, the mud density measurement can be transmitted to the surface (e.g. using the mud pulse telemetry device). Various models can be adjusted using the mud density to determine a downhole equivalent circulating density (ECD) or other critical parameters affecting the drilling process.

In another example, the determined mud density can be used to adjust and correct an acoustic measurement such as used for formation evaluation, for example. The speed of sound is an illustrative parameter of the mud which is affected by the mud density. Thus, knowledge of the mud density can be used to correct acoustic measurements that rely on the speed of sound. Similar corrections can be made using other mud parameters that affect acoustic measurements and which are affected by mud density. Other examples where acoustic properties are affected by mud density include acoustic telemetry.

Figure 3:
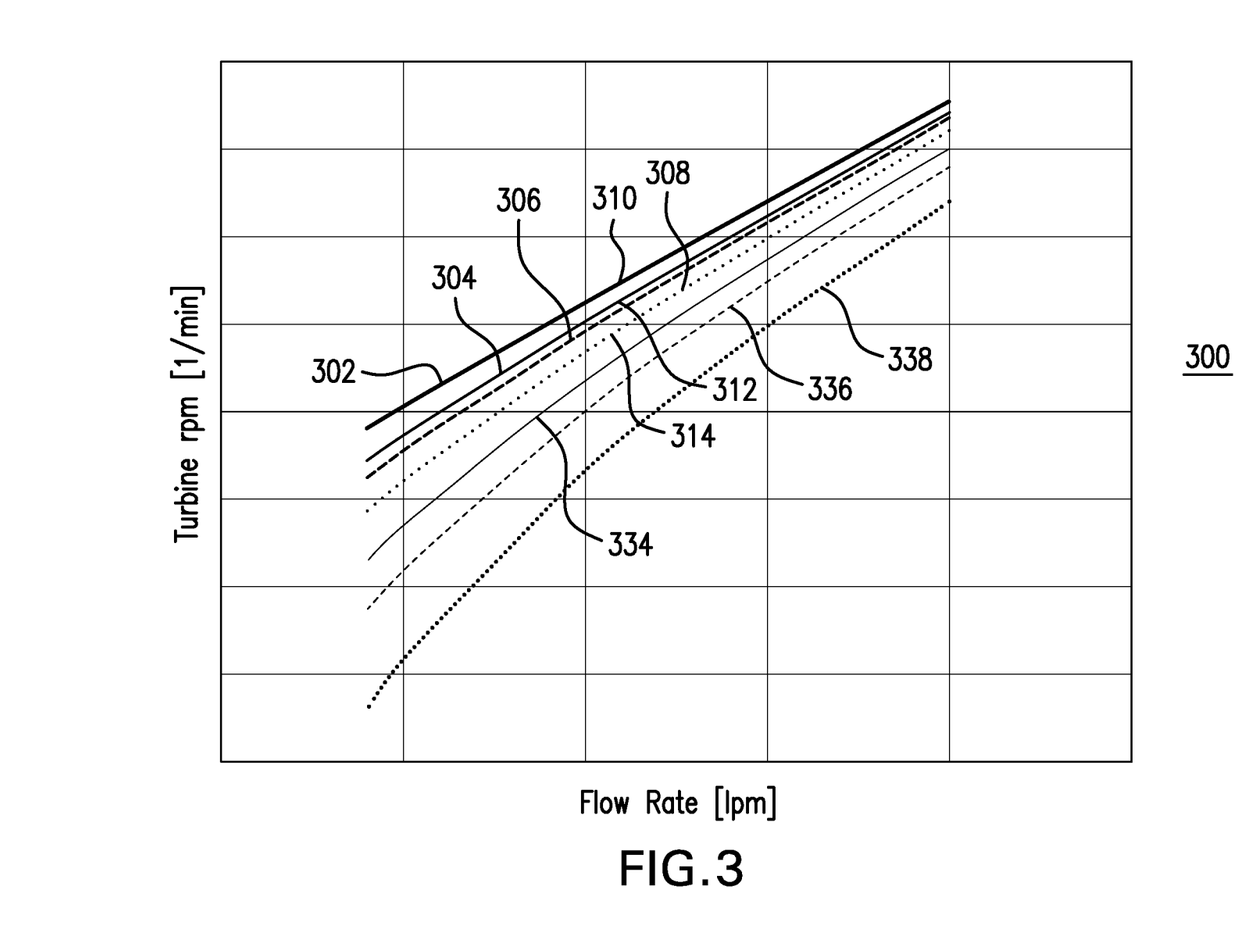
FIG. 3 shows a graph illustrating a relation between downhole rotor speed and mud flow rate through a downhole rotor at different mud densities.

FIG. 3 shows a graph 300 illustrating a relation between downhole rotor speed and mud flow rate through the downhole rotor 202 at different mud densities. FIG. 3 is created for a downhole rotor 202 that is part of a turbine system including the downhole rotor. Flow rate is shown along the abscissa in liters per minute (1 pm) and turbine speed is shown along the ordinate axis as rotational velocity in revolutions per minute (rpm). For illustrative purposes, six performance lines show the relation between turbine speed and flow rate at four different densities and three different braking torques. The turbine speed refers to a rotation rate of the part of the turbine 202 that rotates in response to flow of mud through the turbine. As evident from the graph 300, turbine speed is related to the mud flow rate, for a given mud density and braking torque. For example, in graph 300, turbine speed is mostly linearly related to the mud flow rate, for a given mud density. Those skilled in the art will appreciate that the linear function may be an approximation and other functions may be suited to more accurately describe the relationship between turbine speed and mud flow rate. For example, the relationship between turbine speed and mud flow rate may be more accurately approximated by a higher degree polynomial (such as a polynomial of $2^{nd}$ degree, $3^{rd}$ degree etc.), a polynomial with negative, rational or irrational exponents, or an exponential function or any combination thereof. These performance lines can be determined by performing tests in a laboratory prior to deployment of, or independently of use of, the pulser 132 in the wellbore. Alternatively, they can be calculated by an analytic or numeric algorithm. The performance lines can be stored as values in a lookup table or as functional parameters for a functional relationship, for example in a database 210 or any kind of memory accessible by the downhole processor 208. For example, the measured values can be interpolated by one or more interpolation functions, such as a linear function, a higher degree polynomial (such as a polynomial of $2^{nd}$ degree, $3^{rd}$ degree etc.), a polynomial with negative, rational or irrational exponents, or an exponential function or any combination thereof (for example, a piecewise interpolation).

Performance line 302 shows the relation between turbine speed and flow rate for a turbine having no (or relatively low) brake load applied. For example, performance line 302 may show the relation between turbine speed and flow rate for a turbine when no active brake is activated but the braking torque is only caused by the internal friction of the turbine and/or parts rotated by the turbine, such as alternator 204. In the case of no or relatively low brake load applied, the rotation rate of the turbine will reside along performance line 302 for any mud density. Performance lines 304, 306, 308 show the relation between turbine speed and flow rate when a first specified (i.e., known and constant) brake torque is applied to the turbine at different mud densities. Line 304 refers to a performance line when the density of the mud is a high density (e.g., 2 kilogram per liter) and when the first specified brake torque is applied to the turbine. Performance line 306 shows the relation between turbine speed and flow rate when the specified brake torque is applied to the turbine and the density of the mud is a medium density (e.g. 1.5 kilograms per liter). Performance line 308 shows the relation between turbine speed and flow rate when the specified brake torque is applied to the turbine and the density of the mud is a low density (e.g., 1 kilograms per liter). The turbine speed achieved by applying the specified brake load is measured and used to identify a performance line and therefore the mud density.

As an example, turbine 202 is operated with no load at a no load rotation rate at a constant no load flow rate, as shown at point 310 along performance line 302. With the specified first braking torque applied, the first rotation rate is determined (point 312 along performance line 304), then the density can be determined as a first density value because the performance point falls on line 304. If, with the same first braking torque applied, the first rotation rate is lower (point 314 along performance line 308), then the density can be determined as a lower first density value.

Performance lines 334, 336, 338 show the relation between turbine speed and flow rate when a second specified (i.e., known and constant) brake torque is applied to the turbine at different mud densities. In graph 300, the second specified brake torque is higher than the first specified brake torque. Line 334 refers to a performance line when the density of the mud is a high density (e.g., 2 kilogram per liter) and when the second specified brake torque is applied to the turbine. Performance line 336 shows the relation between turbine speed and flow rate when the second specified brake torque is applied to the turbine and the density of the mud is a medium density (e.g. 1.5 kilograms per liter). Performance line 338 shows the relation between turbine speed and flow rate when the second specified brake torque is applied to the turbine and the density of the mud is a low density (e.g., 1 kilograms per liter). The turbine speed achieved by applying the second specified brake load is measured and used to identify a performance line and therefore the mud density. In another embodiment, the mud density can be determined by specifying the second turbine speed for the turbine when the second specified brake load is applied and determining the second braking torque that achieves this specified second turbine speed in order to determine mud density. In this embodiment, rotation sensor 214 measures a first turbine speed with the turbine 202 in the first state when the first specified brake load is applied. A second braking torque is applied to the turbine 202 until the second turbine speed is constant (i.e., the second state is achieved). The mud flow rate is kept constant between the first state and the second state, e.g., by verification measurements or other means as explained hereinabove. The electrical sensor 212 measures the electrical load that achieves the second turbine speed. The downhole processor 208 determines the braking torque and thus the corresponding mud density from the electrical load.

While only seven performance lines are shown in graph 300 for illustrative purposes, it is understood that more performance lines can be determined during laboratory testing and stored in the database 210. In addition, when a turbine speed does not directly lie on a performance line stored into the database 210, interpolation using those performance lines that are stored in the database 210 can be used to determine the density.

From FIG. 3, it is evident that the performance lines diverge at lower speeds leading to greater resolution at low flow rates. A first flow rate can be selected with a desired resolution for testing. While the pulser 132 is generally operable using mud flowing at a second flow rate which is a high mud flow rate, the mud flow rate can be reduced to a low flow rate to perform mud density testing. The pulser 132 can be paused and the mud flow rate can be reduced from the second flow rate to the first flow rate suitable for mud density testing at increased resolution. Once the mud density has been determined, the mud flow rate can be increased from the first flow rate to the second flow rate at which the pulser 132 operates.

Figure 4:
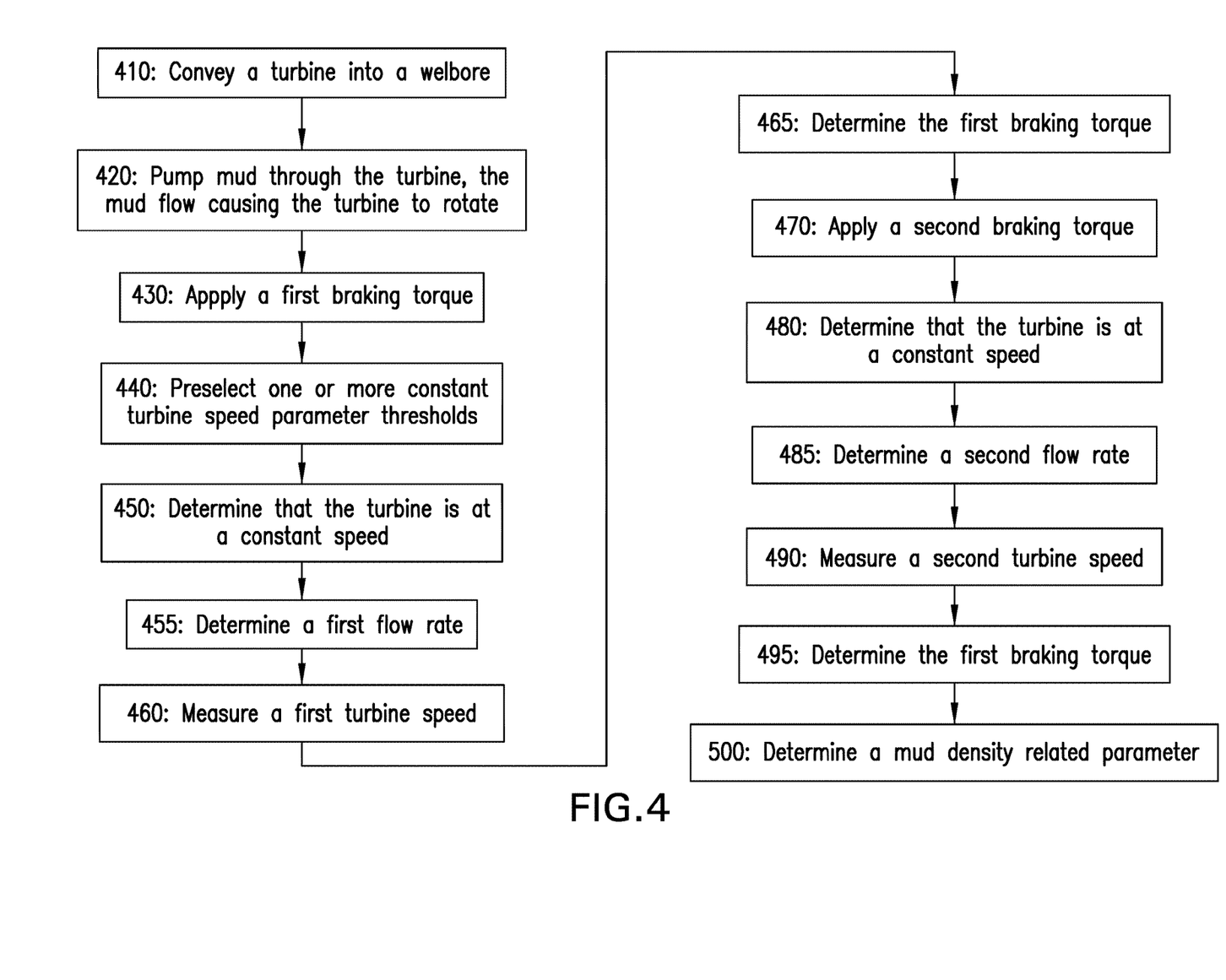
FIG. 4 shows a flow chart illustrating a process for determining a mud density related parameter.

FIG. 4 shows a flow chart illustrating a process 400 to measure a mud density or a mud density related parameter in accordance with one or more embodiments of this disclosure. Process 400 includes several steps illustrated by blocks in FIG. 4. In block 410, a turbine is conveyed into a wellbore. While FIG. 4 illustrates process 400 using a turbine, it is clear that other systems includes a downhole rotor can be used as well without deviating from the scope of this disclosure. The turbine may be part of a drill string, such as the drill string shown in FIG. 1. The drill string is configured to drill a wellbore into a subsurface formation. The turbine may be connected to an alternator that generates electrical power when rotated by the turbine.

In step 420, drilling fluid or mud will be pumped through the turbine, the mud flow causing the turbine to rotate. The pump for pumping the mud through the turbine, may be located at the earth's surface or may be located downhole within the wellbore, such as a part of the drill string. In step 430, a first braking torque may be applied to the turbine causing to the turbine to rotate at a lower rotational velocity than it would if no braking torque was applied. To apply the first braking torque, a brake may be operated, such as by rotating an alternator by the turbine thereby creating an electrical current and connecting an electrical resistance to the output of the alternator in a way that the electrical current will flow through the electrical resistance. The resistance may be preselected to create the desired braking torque to the turbine, for example by modeling or test measurements. The resistance values may then be used to determine the applied first braking torque. In an alternate embodiment, the first braking torque may be applied by a mechanical brake where rotating elements of the turbine are in frictional contact with braking elements that do not rotate or that rotate at different rotational velocity than the turbine. The force that is used to create the frictional contact between the rotating elements of the turbine and the braking elements may be preselected to create the desired braking torque to the turbine, for example by modeling or test measurements. In another alternate embodiment, the first braking torque may be applied by an eddy current brake. In yet another embodiment, the first braking torque may be applied by the internal friction of the turbine and/or the alternator that is operatively coupled to the turbine.

Block 440 illustrates a step, where one or more constant turbine speed parameter thresholds are chosen or selected. Constant turbine speed parameter thresholds are threshold values of constant turbine speed parameters and may be used to determine or define if the turbine has achieved a constant turbine speed. Constant turbine speed parameters may include one or more of a waiting time (e.g., a waiting time after the mud pump started to operate), mud pump speed variation (e.g., statistical pump speed fluctuations, or systematic pump speed deviation, such as a bias or a trend of pump speed over time), and turbine speed variation (e.g., statistical turbine speed fluctuations, or systematic turbine speed deviation, such as a bias or a trend of turbine speed over time). Mud pump speed variations or turbine speed variations may be expressed as absolute variations or relative variations (e.g., relative to an average, such as a percentage of a speed variation relative to a speed average or the like). Typical examples for constant turbine speed parameter threshold values are a waiting time of 1 second or more after starting the mud pump (for example, 10 seconds or more), statistical turbine speed fluctuations of less than 20% of the highest measured value during a selected time interval (for example, 10% or less), or a systematic turbine speed variation (e.g., trend) of less than 10% within a selected time interval (for example, 5% or less). While FIG. 4 shows steps 410-500 of process 400 in a consecutive way, those skilled in the art will understand that the order of one or more of steps 410-500 can be exchanged without deviating from the scope of this disclosure, if not stated otherwise. For example, while step 440 is shown between steps 430 and 450, it is clear that preselecting the one or more constant turbine speed parameter threshold (step 440) can occur at a different point of time, such as before applying the first braking torque (step 430).

In block 450, one or more constant turbine speed parameter will be measured to determine if the turbine is at a constant speed. The one or more measured constant turbine speed parameters will be compared with the constant turbine speed parameter threshold values to determine if the turbine has achieved a constant rotational velocity. Once it has been defined that the turbine achieved a constant rotational velocity, a first mud flow rate and a first turbine speed is measured, in blocks 455 and 460, respectively. Measuring the first mud flow rate can be done in several ways. For example, a turbine (such as turbine 202) can be rotated by the mud flow (or a portion of the mud flow). When the turbine is operatively connected to an alternator (such as alternator 204) that has an output connection (not shown) and is configured to output power such as an output current and/or an output voltage, the output current and/or the output voltage can be measured and used to determine the first mud flow rate. The first mud flow rate can also be determined by other flow meters, such as an obstruction flowmeter, electromagnetic flowmeters, or ultrasonic flowmeters. In one embodiment, the first mud flow rate is measured at the surface location 110 and the measured first mud flow rate is communicated downhole to downhole processor 208 for further processing. The measured first mud flow rate and the first turbine speed value will be stored to a memory (for example, the data base 210 of FIG. 2) or a buffer of a controller or processor, such as the downhole processor 208 of FIG. 2.

In step 465, the first braking torque is measured as described above. When the turbine is operatively connected to an alternator (such as alternator 204) that has an output connection (not shown) and is configured to output power such as an output current and/or an output voltage, the output current and/or the output voltage can be measured and used to determine the first braking torque. Alternatively, if the first braking torque is applied by one or more preselected resistances, the resistance values can be used to determine the first braking torque. The determined first braking torque will be stored to a memory (for example, the data base 210 of FIG. 2) or a buffer of a controller or processor, such as the downhole processor 208 of FIG. 2.

In step 470, a second braking torque—different than the first braking torque—may be applied to the turbine causing to the turbine to rotate at a different rotational velocity than it would if no braking torque or the first braking torque was applied. To apply the second braking torque, a brake may be operated, such as by rotating an alternator by the turbine thereby creating an electrical current and connecting an electrical resistance to the output of the alternator in a way that the electrical current will flow through the electrical resistance. The resistance may be preselected to create the desired braking torque to the turbine, for example by modeling or test measurements. The resistance values may then be used to determine the applied second braking torque. In an alternate embodiment, the second braking torque may be applied by a mechanical brake where rotating elements of the turbine are in frictional contact with braking elements that do not rotate or that rotate at different rotational velocity than the turbine. The force that is used to create the frictional contact between the rotating elements of the turbine and the braking elements may be preselected to create the desired braking torque to the turbine, for example by modeling or test measurements. In another alternate embodiment, the second braking torque may be applied by an eddy current brake. In yet another embodiment, the second braking torque may be applied by the internal friction of the turbine and/or the alternator that is operatively coupled to the turbine.

In block 480, one or more constant turbine speed parameter will be measured to determine if the turbine is at a constant speed. The one or more measured constant turbine speed parameters will be compared with the constant turbine speed parameter threshold values to determine if the turbine has achieved a constant rotational velocity. Once it has been defined that the turbine achieved a constant rotational velocity, a second mud flow rate and a second turbine speed is measured, in blocks 485 and 490, respectively. Measuring the second mud flow rate can be done in several ways. For example, a turbine (such as turbine 202) can be rotated by the mud flow (or a portion of the mud flow). When the turbine is operatively connected to an alternator (such as alternator 204) that has an output connection (not shown) and is configured to output power such as an output current and/or an output voltage, the output current and/or the output voltage can be measured and used to determine the second mud flow rate. The second mud flow rate can also be determined by other flow meters, such as an obstruction flowmeter, electromagnetic flowmeters, or ultrasonic flowmeters. In one embodiment, the second mud flow rate is measured at the surface location 110 and the measured second mud flow rate is communicated downhole to downhole processor 208 for further processing. The measured second mud flow rate and the second turbine speed value will be stored to a memory (for example, the data base 210 of FIG. 2) or a buffer of a controller or processor, such as the downhole processor 208 of FIG. 2. In an alternate embodiment, the second mud flow rate will not be measured but assumed to be equal to the measured first mud flow rate.

In step 495, the second braking torque is measured as described above. When the turbine is operatively connected to an alternator (such as alternator 204) that has an output connection (not shown) and is configured to output power such as an output current and/or an output voltage, the output current and/or the output voltage can be measured and used to determine the second braking torque. Alternatively, if the second braking torque is applied by one or more preselected resistances, the resistance values can be used to determine the second braking torque. The determined second braking torque will be stored to a memory (for example, the data base 210 of FIG. 2) or a buffer of a controller or processor, such as the downhole processor 208 of FIG. 2.

In block 500, the first and second turbine speed data will be used to determine the mud density or a mud density related parameter. The measured values will be used to determine the mud density or the mud density related parameter with the values or the interpolation of the values that are illustrated in chart 300 of FIG. 3. In an alternate embodiment, the measured values will be used to determine the mud density or the mud density related parameter with the algorithm that is used to create the values or the interpolation of the values that are illustrated in the chart of FIG. 3. In yet another alternate embodiment, it may be helpful to calculate a relationship between the first and second turbine speed, such as a ratio or a difference or the like of the first and second turbine speed and calculate the mud density from the calculated relationship between the first and second turbine speed. Similarly, it may be helpful to calculate a relationship between the first and second flow rate, such as a ratio or a difference or the like of the first and second flow rate and calculate the mud density from the calculated relationship between the first and second flow rate.

Those skilled in the art will understand that one or more steps illustrated in FIG. 4 are optional depending on how the mud density or the mud density related parameter is determined. For example, in one embodiment, only one of the first or second braking torque, only one of the first and the second flow rate, and only one of the first and the second turbine speed is used to directly calculate the mud density or the mud density related parameter. For example, by using only one measured braking torque, the corresponding flow rate, and the corresponding turbine speed, the corresponding point in chart 300 can be directly identified and the corresponding mud density can be read or calculated.

In one embodiment, the first flow rate and the second flow rate is assumed to be constant. That is, the difference between the first and the second flow rate is assumed to be small enough so that it can be neglected when determining the mud density with a desired accuracy. In this case, only the first and second braking torque, and the first and second turbine speed can be used to determine the mud density or the mud density related parameter.

In one embodiment, in step 430, the first braking torque is relatively low so that the relationship between mud flow rate and turbine speed does not depend on the mud density (or that the dependence on mud density is neglectable within the context of this disclosure). For example, a relatively low first braking torque would be created if no active brake is applied to the turbine and/or the alternator, but the braking torque is only applied by the internal friction of the turbine and/or the alternator. In an alternate embodiment, the relatively low first braking torque is created by applying an active brake to the turbine and/or the alternator but it is significantly lower than the second braking torque. As shown by performance line 302 in FIG. 3, in this case the relationship between flow rate and turbine speed would not depend on the mud density. In this case, step 455, determining the first flow rate and step 460, measuring the first turbine speed can be done by using performance line 302 in FIG. 3. For example, by measuring the first turbine speed (step 460), the first flow rate can be determined by using the performance line 302 in FIG. 3. Similarly, by measuring the first flow rate (step 455), the first turbine speed can be determined by using the performance line 302 in FIG. 3.

Set forth below are some embodiments of the foregoing disclosure:

Embodiment 1. A method of determining a density of a drilling fluid in a wellbore. A drill string is conveyed into the wellbore, the drill string including a downhole rotor. The drilling fluid is flowed through the drill string in the wellbore causing the downhole rotor to rotate relative to the drill string. A first brake torque is applied to the downhole rotor to place the downhole rotor in a first state. The applied first brake torque is determined. A first downhole rotor speed of the downhole rotor having the drilling fluid flowing therethrough is measured with the downhole rotor in the first state. A density of the drilling fluid is determined from the measured first downhole rotor speed, and the determined applied first brake torque.

Embodiment 2. The method any prior embodiment, further including measuring a first flow rate of the drilling fluid flow with the downhole rotor in the first state and using the measured first flow rate to determine the density of the drilling fluid.

Embodiment 3. The method of any prior embodiment, further including applying a second brake torque to the downhole rotor to place the downhole rotor in a second state, measuring a second downhole rotor speed of the downhole rotor having the drilling fluid flowing therethrough with the downhole rotor in the second state, and determining the density of the drilling fluid from the measured second downhole rotor speed.

Embodiment 4. The method of any prior embodiment, wherein the dependency of the second downhole rotor speed on the mud density is neglected when determining the density of the drilling fluid.

Embodiment 5. The method of any prior embodiment, wherein the measured second downhole rotor speed is used to determine the first flow rate of the drilling fluid flow with the downhole rotor in the first state.

Embodiment 6. The method of any prior embodiment, further including determining the applied second brake torque and determining the density of the drilling fluid from the determined applied second brake torque.

Embodiment 7. The method of any prior embodiment, wherein the drill string further includes an alternator operatively connected to the downhole rotor, the alternator including an output connection, wherein the first brake torque is applied to the downhole rotor by connecting an electrical resistance to the output connection.

Embodiment 8. The method of any prior embodiment, wherein the first downhole rotor speed is measured by measuring at least one of an output voltage of the alternator and an output current of the alternator.

Embodiment 9. The method of any prior embodiment, wherein the first brake torque is measured by measuring at least one of an output voltage of the alternator and an output current of the alternator.

Embodiment 10. The method of claim 1, wherein the drill string further comprises an alternator operatively connected to the downhole rotor and configured to power a pulser system that provides communication from the drill string to a location at the earth's system, further comprising using the determined density to adjust an operating parameter of the pulser system.

Embodiment 11. A system for determining a density of a drilling fluid in a wellbore. The system includes a drill string in the wellbore, the drill string including a downhole rotor, a drilling fluid flowing through the drill string in the wellbore causing the downhole rotor to rotate relative to the drill string, a brake configured to apply a first brake torque to the downhole rotor to place the downhole rotor in a first state, a torque measurement system configured to determine the applied first brake torque, a rotor speed measurement system configured to measure a first downhole rotor speed of the downhole rotor having the drilling fluid flowing therethrough with the downhole rotor in the first state, and a processor configured to determine a density of the drilling fluid from the measured first downhole rotor speed, and the determined applied first brake torque.

Embodiment 12. The system of any prior embodiment, further including a flow rate measurement system configured to measure a first flow rate of the drilling fluid flow with the downhole rotor in the first state, wherein the processor is configured to use the measured first flow rate to determine the density of the drilling fluid Embodiment 13. The system of any prior embodiment, wherein the brake is configured to apply a second brake torque to the downhole rotor to place the downhole rotor in a second state, wherein the rotor speed measurement system is configured to measure a second downhole rotor speed of the downhole rotor having the drilling fluid flowing therethrough with the downhole rotor in the second state, and wherein the processor is configured to determine the density of the drilling fluid from the measured second downhole rotor speed.

Embodiment 14. The system of any prior embodiment, wherein the processor is configured to neglect the dependency of the second downhole rotor speed on the mud density when determining the density of the drilling fluid.

Embodiment 15. The system of any prior embodiment, wherein the processor is configured to use the measured second downhole rotor speed to determine the first flow rate of the drilling fluid flow with the downhole rotor in the first state.

Embodiment 16. The system of any prior embodiment, wherein the processor is configured to determine the applied second brake torque and to determine the density of the drilling fluid from the determined applied second brake torque.

Embodiment 17. The system of any prior embodiment, wherein the drill string further includes an alternator operatively connected to the downhole rotor, the alternator including an output connection, and wherein the brake includes an electrical resistance and wherein the brake applies the first brake torque to the downhole rotor by connecting the electrical resistance to the output connection.

Embodiment 18. The system of any prior embodiment, wherein the rotor speed measurement system is configured to measure the first downhole rotor speed by measuring at least one of an output voltage of the alternator and an output current of the alternator.

Embodiment 19. The system of any prior embodiment, wherein the torque measurement system is configured to measure the first brake torque by measuring at least one of an output voltage of the alternator and an output current of the alternator.

Embodiment 20. The system of any prior embodiment, wherein the drill string further comprises an alternator operatively connected to the downhole rotor and a pulser system configured to provide communication from the drill string to a location at the earth's surface, wherein the processor is configured to use the determined density to adjust an operating parameter of the pulser system.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of determining a density of a drilling fluid in a wellbore, comprising:
conveying a drill string into the wellbore, the drill string comprising a downhole rotor;
flowing the drilling fluid through the drill string in the wellbore causing the downhole rotor to rotate relative to the drill string;
applying a first brake torque to the downhole rotor to place the downhole rotor in a first state having a first rotor speed;
measuring the applied first brake torque;
applying a second brake torque to the downhole rotor to place the downhole rotor in a second state having a second rotor speed;
measuring the second brake torque; and
determining the density of the drilling fluid from a difference between the first brake torque and the second brake torque.

2. The method of claim 1, further comprising measuring a first flow rate of the drilling fluid with the downhole rotor in the first state and using the measured first flow rate to determine the density of the drilling fluid.

3. The method of claim 1, wherein a dependency of the second rotor speed on the density of the drilling fluid is neglected when determining the density of the drilling fluid.

4. The method of claim 3, further comprising determining the first flow rate of the drilling fluid with the downhole rotor in the first state.

5. The method of claim 1, wherein the drill string further comprises an alternator operatively connected to the downhole rotor, the alternator comprising an output connection, wherein at least one of the first brake torque and the second brake torque is applied to the downhole rotor by connecting an electrical resistance to the output connection.

6. The method of claim 5, further comprising measuring the first rotor speed by measuring at least one of an output voltage of the alternator and an output current of the alternator.

7. The method of claim 5, wherein at least one of the first brake torque and the second brake torque is measured by measuring at least one of an output voltage of the alternator and an output current of the alternator.

8. The method of claim 1, wherein the drill string further comprises an alternator operatively connected to the downhole rotor and configured to power a pulser system that provides communication from the drill string to a location at the earth's surface, further comprising using the determined density to adjust an operating parameter of the pulser system.

9. The method of claim 1, further comprising determining the density of the drilling fluid using a relation between a flow rate of the fluid and the first rotor speed, the relation corresponding to the determined applied first brake torque and the density of the drilling fluid.

10. A system for determining a density of a drilling fluid in a wellbore, comprising:
a drill string in the wellbore, the drill string comprising a downhole rotor;
the drilling fluid flowing through the drill string in the wellbore causing the downhole rotor to rotate relative to the drill string;
a brake configured to apply a brake torque to the downhole rotor;
a torque measurement system configured to measure the brake torque; and
a processor configured to:
control the brake to apply a first brake torque to the downhole rotor to place the downhole rotor in a first state having a first rotor speed;
measure the applied first brake torque;
control the brake to apply a second brake torque to the downhole rotor to place the downhole rotor in a second state having a second rotor speed;
measure the second brake torque; and
determine the density of the drilling fluid from a difference between the first brake torque and the second brake torque.

11. The system of claim 10, further comprising a flow rate measurement system configured to measure a first flow rate of the drilling fluid flow with the downhole rotor in the first state, wherein the processor is configured to use the measured first flow rate to determine the density of the drilling fluid.

12. The system of claim 10, wherein the processor is configured to neglect a dependency of the second rotor speed on the density of the drilling fluid when determining the density of the drilling fluid.

13. The system of claim 12, wherein the processor is configured to determine the first flow rate of the drilling fluid with the downhole rotor in the first state.

14. The system of claim 10, wherein the drill string further comprises an alternator operatively connected to the downhole rotor, the alternator comprising an output connection, and wherein the brake comprises an electrical resistance and wherein the brake applies at least one of the first brake torque and the second brake torque to the downhole rotor by connecting the electrical resistance to the output connection.

15. The system of claim 14, further comprising a rotor speed measurement system, wherein the rotor speed measurement system is configured to measure the first rotor speed by measuring at least one of an output voltage of the alternator and an output current of the alternator.

16. The system of claim 14, wherein the torque measurement system is configured to measure at least one of the first brake torque and the second brake torque by measuring at least one of an output voltage of the alternator and an output current of the alternator.

17. The system of claim 10, wherein the drill string further comprises an alternator operatively connected to the downhole rotor and a pulser system configured to provide communication from the drill string to a location at the earth's surface, wherein the processor is configured to use the determined density to adjust an operating parameter of the pulser system.

18. A method of determining a density of a drilling fluid in a wellbore, comprising:
conveying a drill string into the wellbore, the drill string comprising a downhole rotor;
flowing the drilling fluid through the drill string in the wellbore causing the downhole rotor to rotate relative to the drill string;
applying a first brake torque to the downhole rotor to place the downhole rotor in a first state;

determining the applied first brake torque;

measuring a first rotor speed of the downhole rotor having the drilling fluid flowing therethrough with the downhole rotor in the first state; and determining the density of the drilling fluid from the measured first rotor speed and the determined applied first brake torque.

19. The method of claim 18, further comprising measuring a first flow rate of the drilling fluid with the downhole rotor in the first state and using the measured first flow rate to determine the density of the drilling fluid.

20. The method of claim 18, further comprising applying a second brake torque to the downhole rotor to place the downhole rotor in a second state;

measuring a second rotor speed of the downhole rotor having the drilling fluid flowing therethrough with the downhole rotor in the second state; and determining the density of the drilling fluid from the measured second rotor speed.

21. The method of claim 20, wherein a dependency of the second rotor speed on the density of the drilling fluid is neglected when determining the density of the drilling fluid.

22. The method of claim 21, further comprising determining the first flow rate of the drilling fluid with the downhole rotor in the first state.

23. The method of claim 20, further comprising determining the applied second brake torque and determining the density of the drilling fluid from the determined applied second brake torque.

24. The method of claim 18, wherein the drill string further comprises an alternator operatively connected to the downhole rotor, the alternator comprising an output connection, wherein the first brake torque is applied to the downhole rotor by connecting an electrical resistance to the output connection.

25. The method of claim 24, further comprising measuring the first rotor speed by measuring at least one of an output voltage of the alternator and an output current of the alternator.

26. The method of claim 24, wherein the first brake torque is measured by measuring at least one of an output voltage of the alternator and an output current of the alternator.

27. The method of claim 18, wherein the drill string further comprises an alternator operatively connected to the downhole rotor and configured to power a pulser system that provides communication from the drill string to a location at the earth's surface, further comprising using the determined density to adjust an operating parameter of the pulser system.

* * * * *